United States Patent Office 3,468,887
Patented Sept. 23, 1969

---

3,468,887
PROCESS FOR THE PREPARATION OF 2-PHENYL-AMINO-1,3-DIAZACYCLOALKENES-2
Helmut Stähle and Karl Zeile, Ingelheim am Rhein, Germany, assignors to Boehringer Ingelheim G.m.b.H., Ingelheim am Rhein, Germany, a corporation of Germany
No Drawing. Filed Oct. 24, 1967, Ser. No. 677,755
Claims priority, application Germany, Oct. 31, 1966, B 89,635; Sept. 27, 1967, B 94,681
Int. Cl. C07d *49/30, 49/00;* A61k *27/00*
U.S. Cl. 260—253                                          6 Claims

ABSTRACT OF THE DISCLOSURE

An improved process for the preparation of 2-phenylamino-1,3-diazacycloalkenes-2 comprising reacting an alkylene diamine with a phenylimino carbonic acid derivative and 2-phenylamino-1,3-diazacycloalkenes-2 having useful pharmacological properties, a blood-pressure reducing activity.

PRIOR ART

Belgian Patent No. 623,305 describes a process for the preparation of certain 2-arylamino-1,3-diazacycloalkenes-2 by heating alkylenediamines with an arylisothiuronium salt at 100 to 200° C. in the absence of a solvent. The said process results in relatively good yields for certain compounds and made possible the production of 2-(2,6-disubstituted phenylamino)-1,3-diazacyclopentenes-2, particularly the 2,6-dichloro compound which is a valuable blood pressure reducing agent. However, the said process cannot be used to make many 2-phenylamino-1,3-diazacycloalkenes-2 and requires relatively high temperatures and prolonged reaction periods.

OBJECTS OF THE INVENTION

It is an object of the invention to provide a novel improved process for the preparation of 2-phenylamino-1,3-diazacycloalkenes-2.

It is another object of the invention to provide novel 2-phenylamino-1,3-diazacycloalkenes-2.

These and other objects and advantages of the invention will become obvious from the following detailed description.

THE INVENTION

The novel 2-phenylamino-1,3-diazacycloalkenes-2 of the invention are selected from compounds of the formula

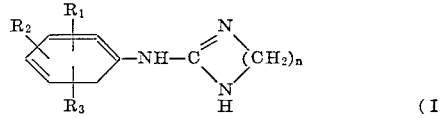
(I)

wherein $n$ is a whole integer from 2 to 5 and when $n$ is 2, $R_1$ is selected from the group consisting of nitro, cyano and amino and $R_2$ and $R_3$ are selected from the group consisting of hydrogen, halogen and alkyl of 1 to 4 carbon atoms with the proviso that $R_1$ may be halogen when $R_2$ and $R_3$ are both halogen and when $n$ is an integer from 3 to 5, $R_1$ is hydrogen and $R_2$ and $R_3$ are selected from the group consisting of halogen and alkyl of 1 to 4 carbon atoms and their non-toxic, pharmaceutically acceptable acid addition salts. A particularly preferred group of compounds are those in which $n$ is 2 and $R_1$, $R_2$ and $R_3$ are halogen, particularly bromine and/or chlorine.

Examples of suitable acids for the non-toxic, pharmaceutically acceptable acid addition salts are inorganic acids such as hydrogen halides, phosphorous acid, nitric acid, sulfuric acid, etc., and organic acids such as acetic acid, propionic acid, lactic acid, maleic acid, fumaric acid, citric acid, tartaric acid, methane sulfonic acid, 8-chlorotheophylline, etc.

The novel 2-phenylamino-1,3-diazacycloalkenes-2 of the invention possess valuable pharmaceutical properties, namely a blood-pressure reducing activity. In addition, some of the said compounds also possess sedative, vasconstrictive and/or secretion-inhibiting properties.

The novel process of the invention for the preparation of 2-phenylamino-1,3-diazacycloalkenes-2 of the formula

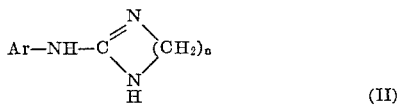
(II)

wherein Ar is phenyl which may be substituted with at least one substituent selected from the group consisting of alkyl of 1 to 4 carbon atoms, trifluoromethyl, halogen, cyano and nitro and $n$ is an integer between 2 to 5 comprises reacting an akylene-diamine of the formula $$H_2N—(CH_2)_n—NH_2 \quad \quad (III)$$

wherein $n$ has the above definition with a compound of the formula

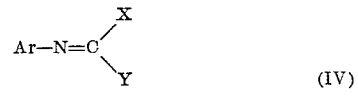
(IV)

wherein Ar has the above definition, X is selected from the group consisting of halogen, lower alkylthio and lower alkoxy of 1 to 7 carbon atoms and —NH$_2$ and Y is halogen with the provisos that Y may be lower alkoxy when X is —NH$_2$ and may be lower alkylthio when X is lower alkylthio to form the corresponding 2-phenylamino-1,3-diazacycloalkene-2. The said product can be converted into its acid addition salt by reacting the compound of Formula II with the desired acid.

The said reaction is preferably performed under anhydrous conditions in an inert organic solvent such as lower alkyl ethers like ethyl ether and aromatic hydrocarbons like benzene, toluene, etc. The reaction temperatures will depend upon the particular reactants but is usually between —10° to 30° C., preferably 0–15° C. The preferred compounds of Formula IV are those where X and Y are both halogens, particularly bromine and/or chlorine.

As a modification of the process of the invention to produce 2-(aminophenylamino)-1,3-diazacycloalkenes-2, the corresponding nitro compound produced as described above is converted into an amino compound by known methods such as hydrogenation with a Raney-nickel catalyst.

The process of the invention has the advantage of being performed in one step at low reaction temperatures in short reaction times. For example, the reaction of an alkylene diamine with a phenyl-isocyanide dichloride takes place immediately without heating in contrast to the process of Belgian Patent No. 623,305 which requires 100 to 200° C. temperatures. This results in considerable saving in plant equipment and energy consumption.

Some of the starting compounds of Formula IV are known from DBP No. 1,094,737 and No. 1,138,039, British Patent No. 888,646 and French Patent No. 1,256,-873 or can be prepared by the processes described in said patents. To prepare compounds of Formula IV in which at least one of X and Y is other than halogen, compounds of Formula IV with X and Y halogen are reacted with a lower alkanol or lower alkyl mercaptan or ammonia.

The novel therapeutic compositions of the invention are comprised of at least one compound of Formula I or their non-toxic, pharmaceutically acceptable acid addition salts and a pharmaceutical carrier. The said compositions are preferably made up for oral or parenteral administration.

Solid compositions for oral administration include compressed tablets, pills and granules. In these compositions one or more of the compounds of general Formula I are mixed with at least one inert diluent, such as calcium carbonate, starch, alginic acid or lactose. Besides inert diluents, the compositions may also comprise additional substances, for example lubricating agents such as magnesium stearate. Liquid compositions for oral administration include pharmaceutically acceptable emulsions, solutions, suspensions, syrups and elixirs. These contain inert diluents such as water, they may also comprise adjuvants, such as wetting and suspending agents, as well as sweetening and flavouring agents. Further compositions for oral administration are capsules of absorbable material such as gelatin, containing one or more of the active substances with or without the addition of diluents or excipients.

For parenteral administration, the compositions include sterile aqueous or non-aqueous solutions, emulsions or suspensions. As non-aqueous suspending media may, for example, be used propylene glycol, polyethylene glycol or vegetable oils. Such compositions may also contain adjuvants, such as wetting, emulsifying and dispersing agents. They may be sterilized in conventional manners. Besides they may be produced in the form of sterile solid compositions, soluble in sterile water or some other sterile injectable medium immediately before they are applied.

All composition forms may contain further active ingredients, such as diuretics or other hypotensive agents. Suitable preparations of the said compositions contain from 0.1 to 100 mg., preferably 0.5 to 50 mg. per dosage unit of the active ingredients.

The novel method of the invention comprises administering to warm-blooded animals an effective amount of at least one compound of Formula I or their acid addition salts. The usual useful dose is 0.0083 to 0.83 mg./kg. of body weight.

In the following examples there are described several preferred embodiments to illustrate the invention. However, it should be understood that the invention is not intended to be limited to the specific embodiments.

Example I.—Preparation of 2-(2',6'-dichlorophenylamino)-1,3-diazacyclopentene-2

Step A: Preparation of 2,6-dichlorophenylformamide. —A solution of 100 gm. of 2,6-dichloroaniline in 200 gm. of formic acid was refluxed for four hours at 100° C. as described in French Patent No. 1,341,781 and then was cooled and poured onto ice. The precipitate was vacuum filtered, washed with water and petroleum ether (boiling point of 40° C.), dried over $P_2O_5$ and recrystallized from 300 ml. of 1:1 benzene-ethanol mixture to obtain 69 gm. (64.6% yield) of 2,6-dichlorophenyl formamide having a melting point of 176–176.5° C.

Step B: Preparation of 2,6-dichlorophenyl-isocyanide-dichloride.—19 gm. (0.1 mole) of 2,6-dichlorophenyl-formamide were added to a solution of 13.5 gm. of sulfonyl chloride in 30 cc. of thionyl chloride at a temperature below 10° C. as described in German Patent No. 1,094,737 and a thick crystal mass formed in a very short time. Then, the reaction mixture was heated at 55 to 60° C. for 10 hours whereby the crystal mass gradually liquified with evolution of HCl and $SO_2$. The insoluble material was filtered off and the filtrate was evaporated to dryness under water-jet vacuum to remove excess thionyl chloride. The residue was fractionally distilled under high vacuum to obtain 10.2 gm. (42.0% yield) of colorless 2,6-dichlorophenyl-isocyanide dichloride having a boiling point of 65–68 C. at 0.02 mm. Hg.

Step C: Preparation of 2-(2',6'-dichlorophenylamino)-1,3-diazacyclopentene-2 and its hydrochloride.—7.3 gm. (0.03 mole) of 2,6-dichlorophenyl-isocyanide dichloride were dissolved in 20 cc. of benzene and 1.8 gm. (0.03 mole) of ethylenediamine were slowly added thereto at 5 to 10° C. The resulting liquid suspension was allowed to stand for 2 hours at room temperature during which a thick white crystal mass (2.15 gm. having a melting point of 317–318° C.) was formed which was filtered off. The filtrate was admixed with petroleum ether (boiling point 40–80° C.) and the precipitate was filtered, washed with petroleum ether and dried to obtain 2.5 gm. (36.6% yield) of 2-(2',6'-dichlorophenylamino)1-3-diazacyclopentene-2 having a melting point of 136–138° C.

The free base was dissolved in 200 cc. of ether and the resulting solution was filtered to remove any insoluble material and then mixed with ethereal hydrochloric acid to obtain a pH of about 4. The hydrochloride salt of the free base precipitated, was filtered and dried to obtain 2.6 gm. (33.2% yield) of the said hydrochloride. The hydrochloride thus obtained proved to be identical by thin layer chromatogram, IR-spectrum and elementary analysis with a 2-(2',6'-dichlorophenylamino)-1,3-diazacyclopentene-(2), obtained according to the process of the Belgian Patent No. 623,305 and the mixed melting point with such a product did not show any depression.

Example II.—Preparation of 2-(2',6'-dichlorophenylamino)-1,3-diazacyclopentene-2

Step A: Preparation of 2,6-dichlorophenylimino-methylchlorocarbonate.—12.15 gm. (0.05 mole) of 2,6-dichlorophenylisocyanide dichloride were dissolved in 20 cc. of absolute methanol and a solution of 1.15 gm. (0.05 mole) of sodium in 20 cc. of absolute methanol was added thereto with stirring and ice cooling over 45 minutes. The sodium chloride formed was filtered off and the filtrate was evaporated under vacuo to dryness and then fractionally distilled to obtain 9.2 gm. of pure 2,6-dichlorophenylimino - methylchlorocarbonate having a boiling point of 65–68° C. at 0.02 mm. Hg.

Step B: Preparation of 2-(2',6'-dichlorophenylamino)-1,3-diazacyclopentene-2·HCl.—4.0 gm. (0.016 mole) of 2,6-dichloro-phenylimino methylchloro carbonate were dissolved in 40 cc. of absolute benzene and a solution of 1.0 gm. (0.016 mole) of ethylenediamine in 20 cc. of benzene was added thereto dropwise at 10° C. After stirring the reaction mixture for one hour at room temperature, it was heated at reflux for 5 hours. The white by-product was filtered off and the filtrate was extracted with 2 N hydrochloric acid. The aqueous hydrochloric acid extracts were extracted with ether at varying pH's and the ethereal extracts having a pH greater than 7 contained the desired product and a small amount of impurity.

The basic solutions were dried over magnesium sulfate and adjusted to a pH of about 4 with ethereal hydrochloric acid. The precipitate was recrystallized 3 times from methanol ether to obtain pure 2-(2',6'-dichlorophenylamino)-1,3-diazacyclopentene-2 hydrochloride having a melting point of 316–318° C.

Example III

Step A: Preparation of 2-(2',6'-dichlorophenylamino)-1,3-diazacyclopentene-2.—A solution of 4.2 gm. (0.05 mole) of sodium ethyl mercaptide in 20 cc. of methanol was added slowly at 10° C., with stirring to a solution of 12.15 gm. (0.05 mole) of 2,6-dichlorophenylisocyanide dichloride in 30 cc. of absolute benzene and the mixture was allowed to stand overnight. The precipitated sodium chloride was filtered off and the solvent was removed from the filtrate by vacuum distillation. The partly crystalline residue was admixed with petroleum ether (boiling point of 40° C.), the insoluble material was filtered off and the filtrate was evaporated under vacuum to dryness to obtain 6.0 gm. of 2,6-dichlorophenylimino-ethylchlorothiocarbonate.

Step B: Preparation of 2-(2',6'-dichlorophenylamino)-1,3-diazacyclopentene-2.—5.5 gm. (0.02 mole) of 2,6-dichlorophenylimino-ethylchlorothiocarbonate were dissolved in 30 cc. of absolute benzene and a solution of 1.4 ml. (0.02 mole) of ethylenediamine in 20 cc. of absolute benzene was added dropwise thereto with stirring at 10° C. The reaction mixture was allowed to stand at room temperature over night and then was heated at reflux for 5 hours. The benzene solution was cooled and extracted with 1 N hydrochloric acid. The aqueous phase was then extracted with ether at varying pH values and the ether extracts having a pH higher than 6.5 were combined and dried. The ether solution was adjusted to a pH of about 4 by the addition of ethereal hydrochloric acid and the resulting precipitate was recrystallized from a small amount of methanol-water to obtain 50 mg. of pure 2-(2',6'-dichlorophenylamino)-1,3-diazacyclopentene-2 hydrochloride having a melting point of 315–318° C.

Example IV.—Preparation of 2-(2'-nitrophenylamino)-1,3-diazacyclopentene-2

27.5 gm. of 2-nitrophenylisocyanide dichloride, prepared by the process of German Patent No. 1,094,737, were dissolved in 70 cc. of absolute benzene and a mixture of 10 cc. of ethylenediamine and 20 cc. of absolute benzene was added dropwise thereto at 5 to 10° C. to form a viscous, brown suspension which was allowed to stand overnight at room temperature. The suspension was made acid with dilute hydrochloric acid and the insoluble residue was filtered off. The filtrate was extracted with ether at varying pH values and the ether extracts having a pH of more than 6 were combined, dried and adjusted a pH of about 4 by the addition of ethereal hydrochloric acid to obtain 2-(2'-nitrophenylamino)-1,3-diazacyclopentene-2 hydrochloride having a melting point of 227 to 229° C.

Example V

Using the procedure of Example IV, there were obtained 9.5 gm. (39.5% yield) of 2-(2'-chloro-4'-nitrophenylamino)-1,3-diazacyclopentene-2 having a melting point of 229–231° C. and whose hydrochloride had a melting point of 262–264° C. after recrystallization of methanol-ether (1:3).

Example VI

Using the procedure of Example IV, there were obtained 6.3 gm. (19.0% yield) of 2-(2'-methyl-4'-nitrophenylamino)-1,3-diazacyclopentene-2 having a melting point of 181–185° C. and whose hydrochloride had a melting point of 207–210° C.

Example VII.—Preparation of 2-(4'-amino-2'-chlorophenylamino)-1,3-diazacyclopentene-2

7.2 gm. (0.03 mole) of 2-(2'-chloro-4'-nitrophenylamino)-1,3-diazacyclopentene-2, prepared as in Example V, in a mixture of methanol and monomethyl ether of glycol were hydrogenated with a Raney nickel catalyst until 2.24 liters of hydrogen at 22° C. and 734 torr had been taken up. The hydrogenation was then stopped and the catalyst was filtered off. The filtrate was evaporated to dryness and the residue was dissolved in dilute hydrochloric acid. The solution was extracted with ether and the equeous acid phase was treated with activated charcoal, made alkaline with 5 N sodium hydroxide and extracted successively with ether, chloroform and ethyl acetate. The chloroform and ethylacetate phases were combined, dried and adjusted to a pH of about 4 with ethereal hydrochloric acid. The precipitate was filtered, washed with ether and dried to obtained 2.3 gm. (27% yield) of dihydrochloride of 2-(2'-chloro-4'-aminophenylamino)-1,3-diazacyclopentene-2 having a melting point of 273–276° C. after recrystallization from methanol-ether.

Example VIII

Using the procedure of Example VII, there was obtained a 23.7% yield of 2-(2'-methyl-4'-aminophenylamino)-1,3-diazacyclopentene-2 having a melting point of 278–281° C.

Example IX

Using the procedure of Example VII, there was obtained from 2 - (4' - nitro - 2',5' - dichlorophenylamino) - 1,3-diazacyclopentene - 2,2 - (4'-amino-2',5'-dichlorophenylamino)-1,3-diazacyclopentene-2 having a melting point of 155–157° C. and whose nitrate salt had a melting point of 186–186.5° C.

Example X.—Preparation of 2-(2',4',6'-trichlorophenylamino)-1,3-diazacyclopentene-2

A mixture of 14 gm. (0.05 mole) or 2,4,6-trichlorophenylisocyanide dichloride (boiling point of 143–145° C. at 14 torr) and 25 cc. of absolute benzene was added dropwise over 30 minutes at 10° C. to a mixture of 5 cc. of ethylenediamine and 50 cc. of absolute benzene. The reaction mixture was evaporated to dryness and the residue was stirred with petroleum ether (boiling point 40–80° C.). The petroleum ether was filtered off and the 11.5 gm. of residue was dried and dissolved in dilute hydrochloric acid. The insoluble residue filtered off and the bright filtrate was extracted repeatedly with ether at pH of 5 to 7 which removed impurities. The aqueous phase was made alkaline with dilute sodium hydroxide and the precipitate found was vacuum filtered, washed with water and dried to obtain 3.5 gm. (26.5% yield) of 2-(2',4',6'-trichlorophenylamino) - 1,3 - diazacyclopentene-2 having a melting point of 174–176° C. and whose hydrochloride had a melting point of 269–270° C.

Example XI

Using the procedure of Example X, there was obtained 2 - (2',4',5' - trichlorophenylamino) - 1,3 - diazacyclopentene-2 whose nitrate had a melting point of 182–183° C. (decomp.).

Example XII

Using the procedure of Example X, there was obtained 2 - (2',4',6' - tribromophenylamino) - 1,3 - diazacyclopentene-2 whose nitrate had a melting point of 215° C. (decomp.).

Example XIII.—Preparation of 2-(4'-cyanophenylamino)-1,3-diazacyclopentene-2

40 gm. (0.20 mole) of 4-cyanophenylisocyanide dichloride dissolved in 200 cc. of absolute benzene were added dropwise to a solution of 20 cc. (0.30 mole) of ethylene diamine in 50 cc. of absolute benzene and then the resulting reaction mixture was evaporated in vacuo. The residue was dissolved in dilute hydrochloric acid and the solution was filtered to remove insoluble material. The clear, colorless filtrate was made alkaline with dilute sodium hydroxide and the precipitate formed was filtered, washed with water and dried to obtain 34.0 gm. (91.5% yield) of 2 - (4'-cyanophenylamino)-1,3-diazacyclopentene-2 having a melting point of 243.5–245° C. and whose hydrochloride had a melting point of 254–255° C.

Example XIV.—Preparation of 2-(2',3'-dichlorophenylamino)-1,3-diazacyclohexene-2

A mixture of 7.4 gm. (0.1 mole) of 1,3-diaminopropane and 80 cc. of absolute benzene was added dropwise with stirring over 1 hour at 5° C. to a solution of 24.3 gm. (0.1 mole) of 2,3-dichlorophenylisocyanide dichloride in 100 cc. of absolute benzene whereby a yellowish white precipitate formed. The solvent was removed by evaporation in vacuo and the residue was dissolved in 2 N hydrochloric acid. The insoluble residue was filtered off and the filtrate was made alkaline with 2 N sodium hydroxide whereby a precipitate formed which was filtered, washed with water and dried to obtain 2-(2',3'-dichlorophenylamino)-1,3-diazacyclohexene-2 having a melting point of 161–162° C. and whose hydrochloride had a melting point of 243–245° C.

Example XV.—Preparation of 2-(2',6'-dichlorophenyl-amino)-1,3-diazacycloheptene-2

4 gm. (0.045 mole) of 1,4-diaminobutane dissolved in 50 cc. of absolute benzene were added dropwise with stirring to a solution of 7.3 gm. (0.03 mole) of 2,6-dichlorophenylisocyanide dichloride in 50 cc. of absolute benzene at 5 to 10° C. and the resulting suspension was allowed to stand overnight at room temperature. The suspension was filtered and the filtrate was evaporated to dryness in vacuo. The viscous oil residue was dissolved in dilute hydrochloric acid and the solution was filtered to remove insoluble residue. The solution was extracted with ether at varying pH values and the ether extracts at a pH higher than 7 were combined, dried and the pH was adjusted to about 4 by the addition of ethereal hydrochloric acid. The precipitate was filtered, washed and dried to obtain 1.4 gm. (15.8% yield) of 2-(2',6'-dichlorophenyl-amino)-1,3-diazacycloheptene-2 hydrochloride having a melting point of 314–316° C.

Example XVI

Using the procedure of Example XV, there was obtained the nitrate of 2-(2',3'-dichlorophenylamino)-1,3-diazacycloheptene-2 having a melting point of 228–230° C.

Example XVII

Using the procedure of Example XV, there was obtained the nitrate of 2-(2',4'-dimethylphenylamino)-1,3-diazacycloheptene-2 having a melting point of 180–185° C.

Example XVIII

Using the procedure of Example XV, there was obtained the nitrate of 2-(2'-chloro-4'-methyl-phenylamino)-1,3-diazacycloheptene-2 having a melting point of 195° C.

Example XIX.—Preparation of 2-(2',6'-dichloro-phenylamino)-1,3-diazacyclooctene-2

3.24 gm. (105%) of 1,5-diaminopentane dissolved in 50 cc. of absolute benzene were added dropwise with stirring at 5–10° C. to a solution of 7.3 gm. (0.03 mole) of 2,6-dichlorophenyl isocyanide dichloride in 50 cc. of absolute benzene and the mixture was allowed to stand overnight at room temperature. The solvent was evaporated off in vacuo and the residue was dissolved in dilute hydrochloric acid. The insoluble portion was filtered off and the filtrate was extracted with ether at varying pH values. The ether extracts having a pH greater than 7 were combined, dried over MgSO₄ and adjusted to a pH of about 4 with concentrated nitric acid. The precipitate was filtered off, washed and dried to obtain the nitrate of 2-(2',6'-dichlorophenylamino)-1,3-diazacyclooctene-2 having a melting point of 263° C.

PHARMACOLOGICAL COMPOSITIONS

Example A—Tablets

| Ingredients: | Parts |
|---|---|
| 2-(2',4',6'-trichlorophenylamino)-1,3-diaza-cyclopentene-(2)·HCl | 0.2 |
| Lactose | 54.8 |
| Maize starch | 30.0 |
| Soluble starch | 4.0 |
| Magnesium stearate | 1.0 |
| | 90.0 |

Example B—Tablets

| Ingredients: | Parts |
|---|---|
| 2-(2'-chloro-4'-nitrophenylamino)-1,3-diaza-cyclopentene-(2)·HCl | 0.8 |
| Lactose | 54.2 |
| Maize starch | 30.0 |
| Soluble starch | 4.0 |
| Magnesium stearate | 1.0 |
| | 90.0 |

The individual ingredients were thoroughly admixed with each other and the intimate mixture is pressed in conventional fashion into 90.0 mg. tablets.

Example C—Drops (0.2 mg. in 1 ml.=20 drops)

| Ingredients: | Parts |
|---|---|
| 2-(2',4',5'-trichlorophenylamino)-1,3-diaza-cyclopentene-(2)·HNO₃ | 0.02 |
| Methyl-p-hydroxybenzoate | 0.07 |
| Propyl-p-hydroxybenzoate | 0.03 |
| Demineralised water, ad | 100. |

Example D—Ampoules

| Ingredients: | Parts |
|---|---|
| 2-(2',4',6'-trichlorophenylamino)-1,3-diaza-cyclopentene-(2)·HCl | 0.50 |
| Sodium chloride | 18.0 |
| Dist. water, ad | 2. |

PHARMACOLOGICAL DATA

Using the test procedure of French BSM 21 54 the blood pressure reducing activity of 2-(2',4',6'-trichlorophenylamino)-1,3-diazacyclopentene-2 hydrochloride was determined on rabbits in urethane narcosis. The said compound was administered intravenously and the blood pressure reduction was measured with a mercury manometer on the arteria carotis. The results are summarized in Table I. Not only was the reduction in the blood pressure rapid, the full effect thereof lasted for several hours.

TABLE I

| Dosage in γ/kg | 30 | 100 | 300 | 1,000 |
|---|---|---|---|---|
| No. of tests | 4 | 6 | 5 | 9 |
| Average drop in blood pressure in mm./Hg | 9 | 24.3 | 31.6 | 37 |

Various modifications of the compositions and method of the invention may be made without departing from the spirit or scope thereof and it is to be understood that the invention is to be limited only as defined in the appended claims.

We claim:
1. A process for the preparation of a 2-phenylamino-1,3-diazacycloalkene-2 of the formula

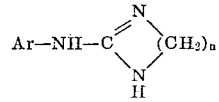

wherein Ar is phenyl which may be substituted with at least one substituent selected from the group consisting of alkyl of 1 to 4 carbon atoms, trifluoromethyl, halogen, cyano and nitro and n is an integer between 2 to 5 which comprises reacting an alkylenediamine of the formula

wherein n has the above definition with a compound of the formula

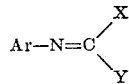

wherein Ar has the above definition, X is selected from the group consisting of halogen, lower alkylthio and lower alkoxy of 1 to 7 carbon atoms and —NH₂ and Y is halogen with the provisos that Y may be lower alkoxy when X is —NH₂ and may be lower alkylthio when X is lower alkylthio to form the corresponding 2-phenylamino-1,3-diazacycloalkene-2.

2. The process of claim 1 wherein the Ar is substituted with a nitro group and the 2-(nitrophenylamino)-1,3-diazacycloalkene-2 is hydrogenated in the presence of a Raney nickel catalyst to form the corresponding 2-(amino-phenylamino)-1,3-diazacycloalkene-2.

3. The process of claim 1 wherein the 2-phenylamino-1,3-diazacycloalkene-2 is reacted with a non-toxic, pharmaceutically acceptable acid to form the corresponding acid addition salt.

4. The process of claim 1 wherein X and Y are chlorine.

5. The process of claim 1 wherein $n$ is 2.

6. The process of claim 1 wherein the reaction is effected in an inert organic solvent.

References Cited

UNITED STATES PATENTS

| | | | |
|---|---|---|---|
| 2,899,426 | 8/1959 | Bloom | 260—309.6 |
| 2,899,434 | 8/1959 | Bloom | 260—256.4 |
| 3,147,275 | 9/1964 | Fruhstorfer et al. | 260—309.6 |
| 3,202,660 | 8/1965 | Zeile et al. | 260—256.4 |
| 3,236,857 | 2/1966 | Zeile et al. | 260—309.6 |

FOREIGN PATENTS 625,631   8/1961   Canada.

OTHER REFERENCES

Netherlands Application 6411516, April 1965.

HENRY R. JILES, Primary Examiner

NATALIE TROUSOF, Assistant Examiner

U.S. Cl. X.R.

260—239, 256.4, 309.6, 453, 465, 562, 564, 566; 424—253, 273